CONSTANT VOLTAGE DEVICE

Filed Feb. 13, 1962

INVENTOR.
ALFRED M. HESTAD
BY J. Warren Whitesel
ATTORNEY 3,223,781
CONSTANT VOLTAGE DEVICE
Alfred Magnus Hestad, Chicago, Ill., assignor to International Telephone and Telegraph Corporation, New York, N.Y., a corporation of Maryland
Filed Feb. 13, 1962, Ser. No. 174,351
12 Claims. (Cl. 179—1)

Figure 1:
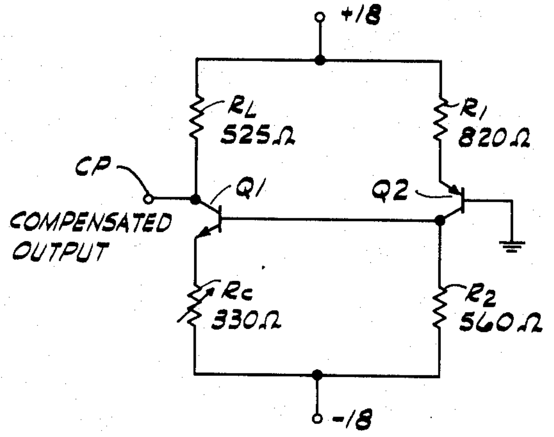

This invention relates to constant voltage devices and more particularly to such devices especially—although not exclusively—designed for use in telephone systems.

Electrical circuits depend for power upon a source of potential, the output of which is taken with respect to a reference or ground potential. Almost certainly this reference potential will drift with changes in circuit and environmental conditions. The amount or degree of drift which may be tolerated depends upon the sophistication of the associated circuitry. If such circuit is unsophisticated, the reference potential may drift without regulation. On the other hand, more sophisticated circuitry requires a reference potential which is stabilized within an extremely close tolerance; therefore, the drift is held to a minimum.

No attempt is made here to explain either all of the many uses of constant voltage devices or the reasons why the voltage may drift. Nevertheless, it may be helpful to review a few examples of these uses and reasons so that the invention may be better understood. For a first example, consider a talking battery which powers a telephone transmitter. The talking battery must be extremely quiet or noise will interfere with conversation. For a second example, consider a recently developed telephone system which depends upon a continuity of current flow to hold established switch paths. If the system reference voltage should develop a sharp transient pulse, there is a current hiatus, and the switch paths release. The transient could result from an excessive demand for power, as when a great number of people telephone reports of a fire, for example. Or a transient could also result from ambient temperature changes. Obviously, many other examples could be cited to illustrate the need for a well stabilized reference voltage.

Existing circuitry does not adequately provide a reference voltage that is stabilized within the close tolerances required for the above cited and other uses. For example, one such existing circuit includes a pair of transistors connected in a so-called "Darlington circuit." These transistors give the equivalent of a single transistor with an alpha which is very close to unit. While these transistors give good results, the reference voltage derived from this Darlington circuit may vary greatly. Another existing circuit depends for stability upon one or more zener diodes. If these diodes fail, the reference voltage deviates violently from a desired level, and delicate equipment may fail or be destroyed. Again, other examples could be cited to illustrate the need for better than existing circuitry, but these examples are though adequate to prove a point.

Accordingly, an object of the invention is to provide new and improved constant voltage devices. In this connection, an object is to provide a well stabilized source of reference voltage which is especially useful in telephone circuitry. Here, an object is to provide an extremely quiet "talking" battery which energizes telephone transmitters, thus giving noise-free voice transmission. Also, an object is to provide a reference voltage that is free from transients. Another object is to prevent any hiatus in current, which might release current holding devices.

A further object is to provide a circuit having general utility for giving an extremely stable source of reference voltage. More particularly, an object is to provide a semiconductor circuit having a high degree of temperature stability. Another object is to accomplish these aims through the use of non-critical, low cost, easily procured, commercial grade, components. Thus, an object is to greatly reduce circuit sophistication by providing reliable circuits which relieve other circuits from marginal operations.

In accordance with one aspect of this invention, a constant voltage device comprises a pair of parallel voltage dividers connected between the terminals of a power source. Each voltage divider includes at least one resistor and an electronic gain device connected in a series circuit. Each electronic gain device includes a pair of principal electrodes for carrying relatively heavy currents and a third electrode for controlling the gain of said device. The third electrode of a first of the devices is connected to a first reference voltage which is the unregulated system ground. The third electrode of the other device is connected to an output electrode of the first device. Thus, voltage variations on the voltage divider including the first device are used to control the gain of the second device. The direction of gain control opposes source variations. Hence, a second regulated reference voltage (called the "compensated output" herein) is taken from the output of the second device.

Figure 2:
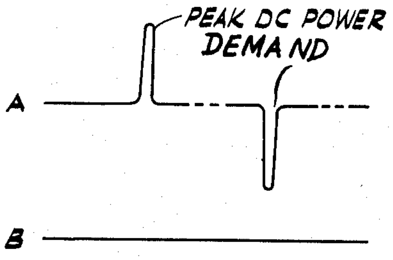
Figure 3:
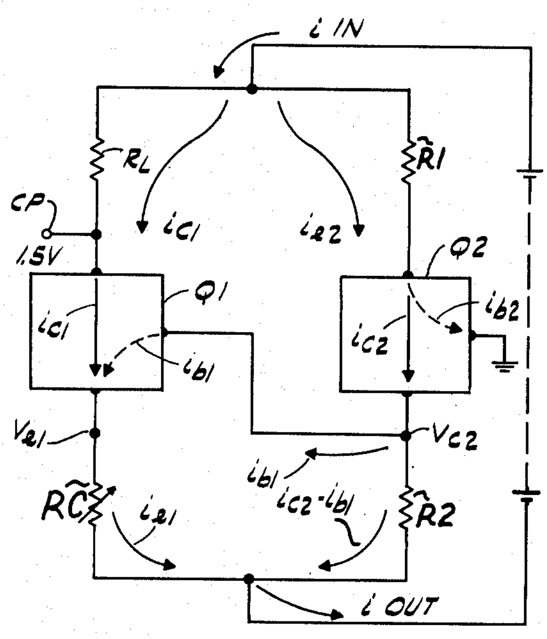
Figure 4:
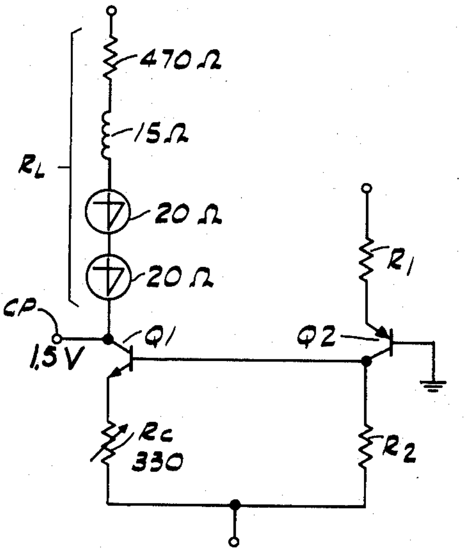

The above mentioned and other features and objects of this invention and the manner of obtaining them will become more apparent, and the invention itself will be best understood by reference to the following description of an embodiment of the invention taken in conjunction with the accompanying drawing, in which:

FIG. 1 shows a constant voltage device embodying the principles of the invention;

FIG. 2 includes two voltage wave forms which help explain the objectives of the invention; wave form A is an unregulated reference voltage, and wave form B is the same reference voltage when well regulated;

FIG. 3 is a version of FIG. 1, redrawn to explain how the circuit operates by showing how the currents flow; and FIG. 4 shows how the invention may be used in an exemplary telephone system.

The drawings and the specification refer to specific voltage and resistance values. While an attempt has been made to specify values which might reasonably be expected, it should be understood that the invention is not necessarily limited thereto, however, the ratios of these values are somewhat critical. No transistor types have been specified because the circuit functions well with any type which those skilled in the art might reasonably be expected to select. Thus, non-critical, low-cost, easily procured commercial grade components may be used.

FIG. 1 shows a constant voltage device connected between the terminals of a power source. The terminals are here marked +18 and −18. This constant voltage device includes a pair of parallel voltage dividers which are connected to give a self-regulated, compensated output reference voltage.

Each voltage divider includes a pair of resistors and an electronic gain device. For example, the left-hand voltage divider as viewed in FIG. 1 includes, in series, a 525 ohm load resistor RL, an electronic gain device Q1, here shown as an NPN junction type device, and a 330 ohm control resistor $R_c$. The right-hand voltage divider includes, in series, an 820 ohm bias resistor $R_1$, an electronic gain device Q2 here shown as a PNP junction type device, and a second 560 ohm bias resistor. It should be noted that the ratios between the resistive values of the two arms of the two voltage dividers are approximately the same, i.e. 820/560 approximately equals 525/330.

Each electronic device includes a pair of principal electrodes (a collector and an emitter, for example) for carrying a relatively heavy current. A third electrode (a base, for example) controls the gain of the device. As those skilled in the art know, variations of the potential on the third or base electrode cause a corresponding change in the emitter-collector current. Thus, the gain of transistor Q2 will tend to remain fairly stable because its third electrode is connected directly to the system ground. Even though unregulated, this ground should be relatively stable. On the other hand, the gain of transistor Q1 will fluctuate with any voltage variations appearing at the collector of transistor Q2. Thus, the voltage variations on the right-hand voltage divider control the gain of the transistor Q2. A second well regulated reference voltage is taken from the compensated output terminal CP.

FIG. 2 shows two wave forms which help explain the objectives of the invention. Curve A shows the reference voltage (unregulated system ground) as having transient spikes. While the cause for these spikes is not important, they are here depicted as occurring at times of peak demand. There could, of course be other causes, such as ambient temperature variations, or the like. In any event, the first exemplary peak is here shown as moving sharply toward positive battery. Thus, a hiatus of current flow occurs in any device connected between ground and positive battery. The second pulse produces similar results on the negative side of the battery. With a circuit incorporating the invention, the compensated output which appears at terminal CP is unvarying, as shown by curve B. Thus, there is little or no change in the reference voltage.

The circuit operation will be more apparent from a study of FIG. 3 which shows the currents resulting from the D.C. bias potentials. While any suitable power source may be used to provide these bias potentials, a battery is here shown as connected across the terminals corresponding to those marked +18 and −18 in FIG. 1.

The current $i_{in}$ flowing from the battery (in conventional positive to negative direction) divides, and flows through the two voltage dividers, as shown by arrows $i_{c1}$, $i_{e2}$. (The subscripts "*c1*" and "*e2*" mean collector and emitter of transistors Q1, Q2 respectively.) Inside the transistor Q1, the current $i_{c1}$ passes from the collector through the base region to the emitter to provide 95% or more of the emitter current $i_{e1}$. The remaining 5% or less of the emitter current $i_{e1}$ results from the base current $i_{b1}$ drawn by transistor Q1 from the potential point V*c*2. Inside transistor Q2, 95% or more of the current $i_{e2}$ passes from the emitter through the base region to the collector to become current $i_{c2}$. The remaining 5% or less of the current, passes through the base region to ground $i_{b2}$. After the current passes through the transistor Q2, it divides into a first portion $i_{b1}$ drawn through the base of transistor Q1 and a second portion $i_{c2}-i_{b1}$, which flows through resistor R2. Thereafter, the two voltage divider currents recombine to form an output current $i_{out}$ which flows back to the battery.

After the power is applied and electrical values stabilize, the voltage at compensated output point CP goes to approximately +1.5 volts in this particular circuit. As long as the power source potentials remain stable, there is no change at point CP.

Means are provided for automatically controlling the gains of the transistors to compensate for any voltage variations which may occur. The object is to hold an unvarying voltage (+1.5 volts in this particular exemplary construction) at point CP.

First, assume that the potential at the upper terminal moves from +18 volts to +20 volts with respect to ground. To simplify the explanation assume that the potential at the lower terminal remains at a stable −18 volts. Without compensation, point CP would also go positive. This does not happen, however, because the potential across resistor R1 increases and current $i_{e2}$ goes up. The emitter of transistor Q2 goes positive with respect to its base and the voltage drop across transistor Q2 goes down. The voltage at point V*c*2 becomes more positive. When the base of transistor Q1 becomes more positive with respect to its emitter, the voltage drop between its emitter and collector goes down. Thus, the potential at point CP moves toward the −18 volt battery. The amount of such movement toward −18 volts is exactly equal to the amount that point CP would otherwise move positively when the +18 volts potential goes up. Thus, the potential at point CP remains stable and constant at +1.5 volts.

Next, assume that the potential at the lower terminal moves from −18 volts to −20 volts while the potential at the upper terminal remains fixed at +18 volts. The potential at point V*c*2 moves in a negative direction, but the gain of transistor Q2 is not appreciably effected by this change of collector bias. Thus, the current $i_{e2}$ remains constant. The transistor Q2 emitter bias at point V*e*1 moves negative, but transistor gain does not go up because the base potential V*c*2 also goes negative. Since the gain remains constant, the currents $i_{c1}$ and $i_{e1}$ remain constant. This means that the IR drop across the load resistor RL remains constant. Thus, the compensated voltage at point CP remains constant at +1.5 volts.

When both the positive and negative potentials change simultaneously, the above described effects combine to hold a stable voltage at point CP.

Those skilled in the art will readily perceive that the compensated potential at point CP fulfills many needs. Therefore, the circuit has general utility. Moreover, any circuits which require the extremely stable reference voltage provided here, may be greatly simplified because the voltage variations compensating sophistications heretofore required in such circuits may be eliminated.

Despite the fact that the circuit has general utility, it is particularly useful in certain telephone circuits. One such circuit is found in telephone systems where talking batteries which energize telephone transmitters must remain very quiet. While many types of telephone systems will benefit from this quiet talking battery, one exemplary system developed by the International Telephone and Telegraph Corporation experienced signal-to-noise ratio improvements which improved by more than 50 to 1 after the invention was put into use.

Another advantage resulting from the use of this invention in the exemplary system is that current holding switch paths are held with a much greater reliability. More particularly, as shown in FIG. 4, the switch path appears in place of the load resistor RL. This switch path RL includes a number of components having a total series resistance of 525 ohms (the same resistance value as resistor RL has in FIG. 1). The 470 ohm resistor is the source resistance of a positive "holding" battery. The 15 ohm device is one winding of a repeat coil. Voice currents are inductively applied to the switch path via this winding. These voice currents are taken from point CP via a coupling capacitor. The switch path is completed through electronic switching means, here shown as two PNPN diodes which have 20 ohms each when switched "on."

As those familiar with PNPN diodes know, they will remain "on" only so long as current flows through them. If the transients of curve A FIG. 2 appear across switch path RL, there is a hiatus in the current and the diodes switch "off." But with the stabilized voltage of curve B, there is no hiatus and the switch path does not release. The small variations, if any, which may occur in the +18 volt potential are of no significance, especially since most of this variation is soaked up across the 470 ohm resistor.

If any minor voltage variations should occur at compensated output point CP, it is only necessary to adjust a variable control resistor RC. In one exemplary construction, it was found that once the control resistor is correctly adjusted, there is no need to make any further adjustments.

While the principles of the invention have been described above in connection with specific apparatus and applications, it is to be understood that this description is made only by way of example and not as a limitation on the scope of the invention.

I claim:

1. A constant voltage device comprising a plurality of voltage dividers connected in parallel between sources of potential, each arm of said voltage dividers including an impedance element which has characteristics such that relatively large voltage drop variations may occur across the elements, means individually associated with each of said voltage dividers for controlling the gain of current flowing therethrough, means responsive to voltage changes appearing at a potential point on one of said voltage dividers for controlling the current gain in another of said voltage dividers, and means comprising one arm of said other voltage divider for providing a useful load circuit including a telephone speech path, whereby the voltage appearing across said one arm provides the talking battery for said speech path.

2. The constant voltage device of claim 1 wherein said load circuit comprises a telephone switch path including a plurality of PNPN diodes.

3. A constant voltage device comprising a pair of voltage dividers connected in parallel between a pair of potential points, each of said voltage dividers including a series circuit comprising a first resistance, an electronic gain device, and a second resistance, said electronic device having two principal electrodes for carrying current through said voltage divider and a third electrode for controlling the gain of said device, means comprising a first unregulated reference potential connected to the third electrode of a first electronic device in a first of said voltage dividers for stabilizing the gain of said first device, means for connecting an output one of said principal electrodes of the first device to the third electrode of a second electronic device in the other of said voltage dividers, whereby the gain of said second device varies as a function of voltage changes at said output electrode, and means comprising one of the resistances in the other voltage divider for forming a telephone speech path, whereby the voltage appearing across the one resistance provides talking battery for the speech path.

4. The device of claim 3 wherein the first resistance in said other voltage divider comprises a load circuit and the second resistance in said other voltage divider is adjustable.

5. The device of claim 4 wherein said first electronic device is a PNP transistor and said second electronic device is an NPN transistor.

6. The device of claim 5 wherein said load circuit comprises a series of PNPN diodes.

7. A source of stabilized reference potential comprising, a source of power having a current divider connected thereto, said current divider comprising impedance means for conducting each divided part of said current, the voltage drop across each impedance means changing substantially responsive to the variations in current through said means, means for independently regulating the gain of at least one of said divider currents, means responsive to variations in other of said divided currents for adjusting the gain of said one divided current to provide a constant current, and load circruit means associated with said current divider for utilizing said one divided current to control a current sensitive switching device.

8. The source of claim 7 wherein said gain adjusting means comprise a pair of transistors of opposite polarity types, means for diverting said divided currents through individually associated ones of said transistors, and means for utilizing the output of the transistor through which said other current flows for regulating the gain of the transistor through which said one current flows.

9. A reference voltage source comprising a pair of transistors of opposite polarity types, a source of bias potential including positive, negative, and ground potentials, means for resistively connecting the emitter and collector of one of said transistors between the positive and negative potentials and the base of said one transistor to ground, means for resistively connecting the emitter and the collector of the other of said transistors between said positive and negative potentials, said last named resistive connection comprising a talking battery load circuit and a control, and means for connecting the collector of said one transistor to the base of said other transistor.

10. The source of claim 9 wherein each of the two mentioned resistive connections comprise a pair of resistances with a resistance on each side of said emitter-collector of a transistor, the ratios between the resistive values of the two arms of the two connections being approximately the same.

11. A source of regulated reference voltage comprising a pair of transistors of opposite polarity types; a first series connection comprising a positive potential source, a first resistance, the emitter-collector of one of said transistors, a second resistance, and a negative potential source; a second series connection comprising a positive potential source, a third resistance, the emitter-collector of the other of said transistors, a fourth resistance, and a negative potential source; the resistances in one of said series circuits being a talking battery load circuit and a control resistance; and the collector of said one transistor being connected directly to the base of said other transistor.

12. The source of claim 11 wherein the ratio of the values of the first and second resistances approximately equals the ratio of the values of the third and fourth resistances.

References Cited by the Examiner

UNITED STATES PATENTS

| | | | |
|---|---|---|---|
| 2,810,832, | 10/1957 | Broadhead | 307—88.5 X |
| 2,912,638 | 11/1959 | McNamee | 323—22 |
| 2,917,700 | 12/1959 | Chase | 323—22 |
| 3,130,361 | 4/1964 | Ioakikidis | 323—22 |

ROBERT H. ROSE, *Primary Examiner.*

ARTHUR GAUSS, *Examiner.*

J. S. HEYMAN, R. MURRAY, *Assistant Examiners.*